United States Patent Office 3,428,445
Patented Feb. 18, 1969

3,428,445
IRON ORE REDUCTION
Hans Rausch, Oberursel, Taunus, and Günter Heitmann and Wilhelm Thumm, Frankfurt am Main, Germany, assignors to Metallgesellschaft Aktiengesellschaft, Frankfurt am Main, Germany, a corporation of Germany
No Drawing. Filed July 20, 1966, Ser. No. 566,492
Claims priority, application Germany, July 22, 1965, M 66,075
U.S. Cl. 75—3   6 Claims
Int. Cl. C21b 1/16, 13/08

ABSTRACT OF THE DISCLOSURE

Process of producing sponge iron pellets which comprise admixing iron ore with fine particle size sponge iron, pelletizing this mixture by rolling in the absence of mechanical pressure, feeding the thus produced green pellets to a rotary kiln at its upper end, directly reducing the iron ore in said green pellets in said rotary kiln, and recovering sponge iron pellets from the lower end of said kiln.

---

This invention relates to a process for the production of iron from iron ore. It more particularly refers to a process for reducing iron ore.

Iron ore is known to be reducible in a rotary kiln in combination with a suitable reducing agent. It is known to carry out this reduction at a temperature below the melting point of the kiln charge using solid carbon, e.g., coal or coke, as the reducing agent.

A reduction of the ore can be accomplished by pelletizing the ore and charging the green pellets to the hottest part of the kiln, which is at a temperature of at least about 700 to 900° C. or more, such that the fresh feed pellets are subjected to rapid heating at a rate of at least about 25° C. per minute, preferaby about 30 to 50° C. per minute.

It has been suggested to attempt to improve this kiln reduction process by forming sponge iron produced from previous runs of the kiln into pellets and then to subject these pellets to a further kiln reduction treatment. In this process, the pelletized sponge iron may be recycled back to the same kiln from which a portion of the produced sponge iron had been removed to produce the pellets which are recycled. The pelletizing is accomplished through the use of a rolling process without the application of relatively high pressure.

This is contrary to the known processes of producing iron ore briquettes from iron ore and small quantities of sponge iron. In this process an admixture of iron ore and sponge iron, suitably fines, are admixed and then pressed into suitably shaped pellets for charging to the kiln.

It is an object of this invention to provide a process for reducing iron ore.

It is another object to provide a novel process for producing pelletized iron ore suitable for kiln reduction.

It is a further object of this invention to provide a reducing process for iron ore in which the quantity of fines produced is significantly reduced.

Other and additional objects of this invention will become apparent from a consideration of this entire specification including the claims appended hereto.

In accordance with and fulfilling these objects, this invention resides, in one of its aspects, in the production of pelletized iron ore containing up to about 25 percent by weight fine sponge iron admixed therewith, preferably about 10 percent by weight sponge iron fines. These pellets are produced by rolling without the use of significant mechanical pressure. Iron ore pellets produced according to this invention are charged to a reducing rotating kiln in the usual manner, that is, through the top thereof, without the necessity for rapid heating or charging to the hottest part of the kiln. The pellets produced according ot this invention have been found to have excellent strength and ability to withstand kiln treatment without breaking up or abrading to produce fines as is the more common occurrence.

If desired, the kiln may be operated in the conventional manner with the pellets of this invention charged together with the solid reducing agent, coke or coal, as well as with sulfur combining additives, such as lime or dolomite. This total feed combination may suitably be fed into the top of a rotary kiln in continuous or batch operation, as desired.

One particular advantage which has been realized by the practice of this invention resides in the fact that, whereas it had been considered necessary to subject pelletized iron ore to an oxidizing roasting operation before introduction thereof into a rotary kiln in order to provide the necessary degree of cohesion required in the pellets to avoid breaking or abrasion thereof during kiln operation, it has been found that pellets made according to this invention do not require this oxidizing "calcining." These pellets may be charged to the kiln immediately upon manufacture thereof.

Since a reducing kiln in normal operation provides a preheat zone which precedes the main reduction zone, it is possible that pellets made according to this invention and immediately fed to the kiln will undergo some oxidation in the preheat zone. This is not considered to be detrimental since oxidation is an exothermic reaction and thus adds heat to the pellets in particular and to the kiln in general, which heat tends to promote the ultimate reduction process.

It is preferred in the practice of this invention to utilize sponge iron fines in admixture with the iron ore in particle sizes up to about 1 mm. in the largest dimension. Use of such fines has been found to result in excellent pellets. These fines may be derived from the fines product of earlier kiln runs with the same or different iron ore charges.

It is within the spirit and scope of this invention to use substantially any iron ore, even feeds having poor bonding properties, such as hematitic ores or high purity ore concentrates.

The following example is given by way of illustration of the instant invention without in any way being limiting thereon.

Example

The reduction test was carried out with fine grained hematite concentrates and high volatile coal in a rotary kiln. The screen analysis of hematite concentrate was:

| Millimeters: | Percent |
|---|---|
| 0.032 | 96.4 |
| 0.032–0.04 | 1.3 |
| 0.04–0.06 | 0.3 |

The coal had a net calorific value of 5276 kcal./kg., 10.1% $H_2O$, 18.8% ashes, 45.7% C fix and 25.4% volatile matter.

The concentrate was mixed with 10% pulverulent sponge iron and 0.5% bentonite and then the mixture was pelletized. The pulverulent sponge iron was obtained by grinding reduced pellets of the same concentrate.

The pressure strength of the wet green pellets with a water content of 6% was 0.77 kg. per pellet. The average pressure strength of the dried pellets was 4.29 kg. per pellet.

Pellets and coke were charged into the rotary kiln at the upper end together with 5% of dolomite (related to the amount of pellets) with a grain-size of 0.2–1 mm.

The charging rate at the upper end of the kiln was as follows:

| | Kg. |
|---|---|
| Green pellets | 90 |
| Coke | 40 |
| Dolomite | 4.5 |

The coke had been produced from the high volatile coal which was pneumatically fed through the lower end of the rotary kiln at a rate of 45 kg. After discharging and separation, the coked coal was fed to the upper end of the kiln.

The rotary kiln was equipped with six shell burners distributed over the kiln length with separate gas and air inlet valves. The reduction temperature was 1050–1100° C. The kiln rotated with 0.6 revolution per minute. The discharged material was cooled in a rotating cooler.

The discharge of the kiln was separated by magnetic separation. The magnetic fraction had the following grain-size distribution:

| Grain size, mm. | Weight percent | Total Fe/metallic Fe |
|---|---|---|
| +5 | 94.2 | 99.4 |
| 5–1 | 1.9 | 96.1 |
| −1 | 3.9 | 97.0 |
| | 100 | 99.3 |

The fraction −1 mm. which is defined as abrasive material was only 4% of the magnetic fraction compared with about 50% by the known processes.

What is claimed is:

1. The process of producing sponge iron pellets which comprises admixing iron ore with fine particle size sponge iron in an amount up to about 25 wt. percent sponge iron; pelletizing said admixture by rolling such in the substantial absence of mechanical pressure; feeding the thus produced green pellets into the upper end of a rotary kiln, reducing such green pellets in said kiln and recovering the thus produced sponge iron pellets from the lower end of said kiln.

2. Process claimed in claim 1 wherein said green pellets are mixed with discrete particles of solid reducing agent and such admixture is co-jointly fed to the top of said rotating kiln.

3. The process claimed in claim 1, wherein said sponge iron fines have a particle size of up to about 1 mm. and are present in said admixture in an amount of about 10 weight percent.

4. The process claimed in claim 1, wherein said pellets are fed into said kiln immediately upon their manufacture.

5. The process claimed in claim 1, wherein a sulfur combining material is fed along with said pellets.

6. The process claimed in claim 1, wherein said sponge iron is obtained by the reduction of said ore.

References Cited

UNITED STATES PATENTS

| 1,315,315 | 9/1919 | Lämmerhirt | 75—3 |
| 2,793,109 | 5/1957 | Huebler et al. | 75—3 |
| 2,960,396 | 11/1960 | De Vaney | 75—3 |
| 3,097,945 | 7/1963 | Marcel et al. | 75—3 |
| 3,333,951 | 8/1967 | Ban | 75—3 |

FOREIGN PATENTS

| 621,661 | 4/1949 | Great Britain. |

HYLAND BIZOT, *Primary Examiner.*

ERNEST L. WEISE, *Assistant Examiner.*

U.S. Cl. X.R.

75—33